Figure 10:
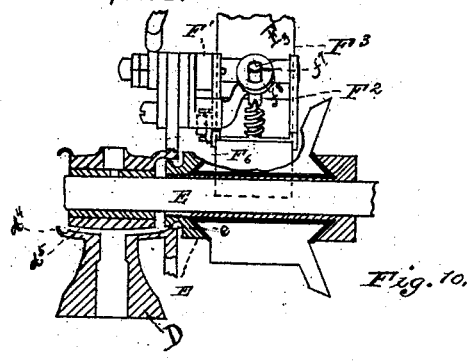

(No Model.)
J. W. DARLEY, Jr.
ELECTRIC MOTOR.
No. 467,924.
4 Sheets—Sheet 1.
Patented Feb. 2, 1892.
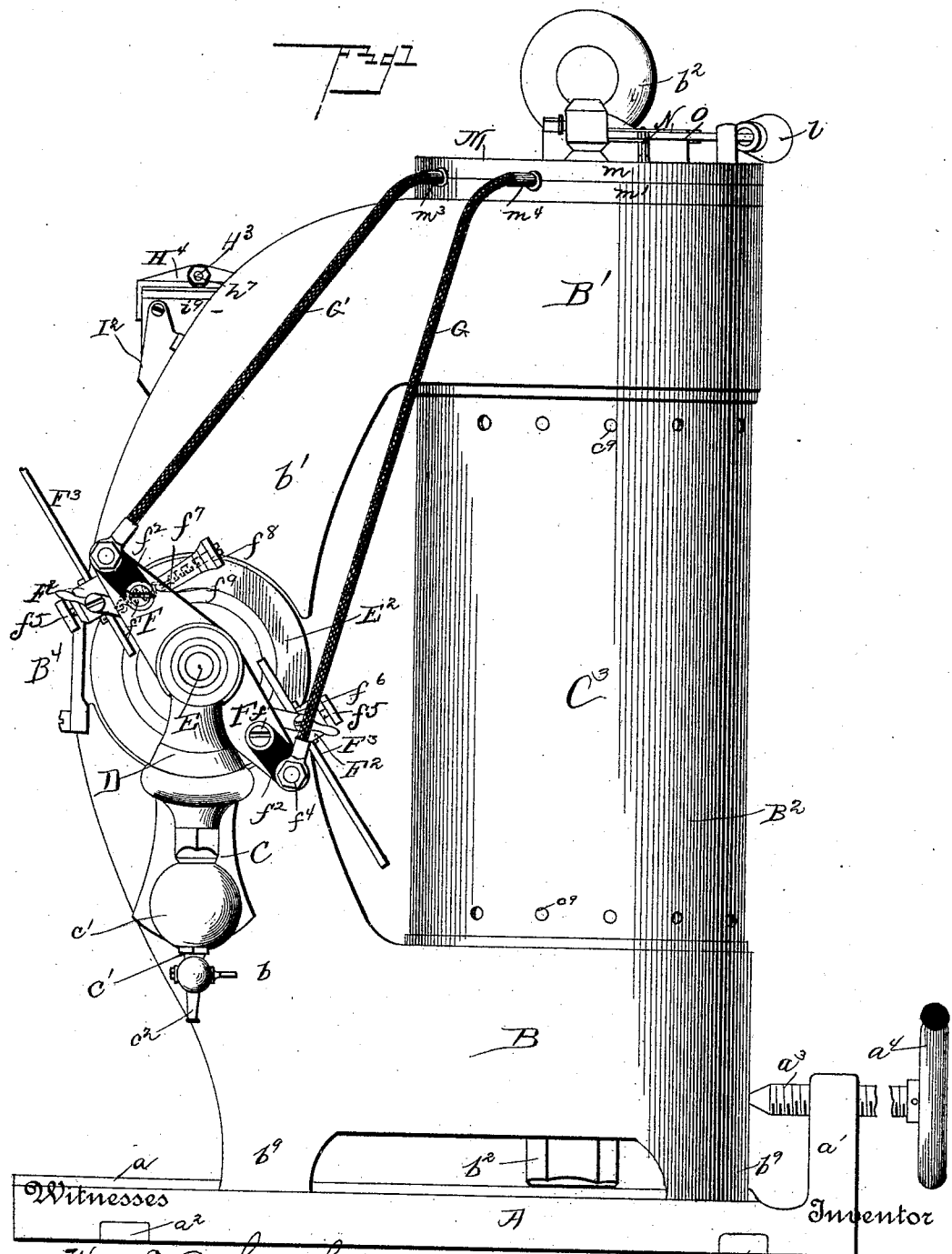
Witnesses
Will E. Aughinbaugh
Vernon M. Dorsey
Inventor
J. W. Darley, Jr.
By his Attorneys
Whitman + Wilkinson

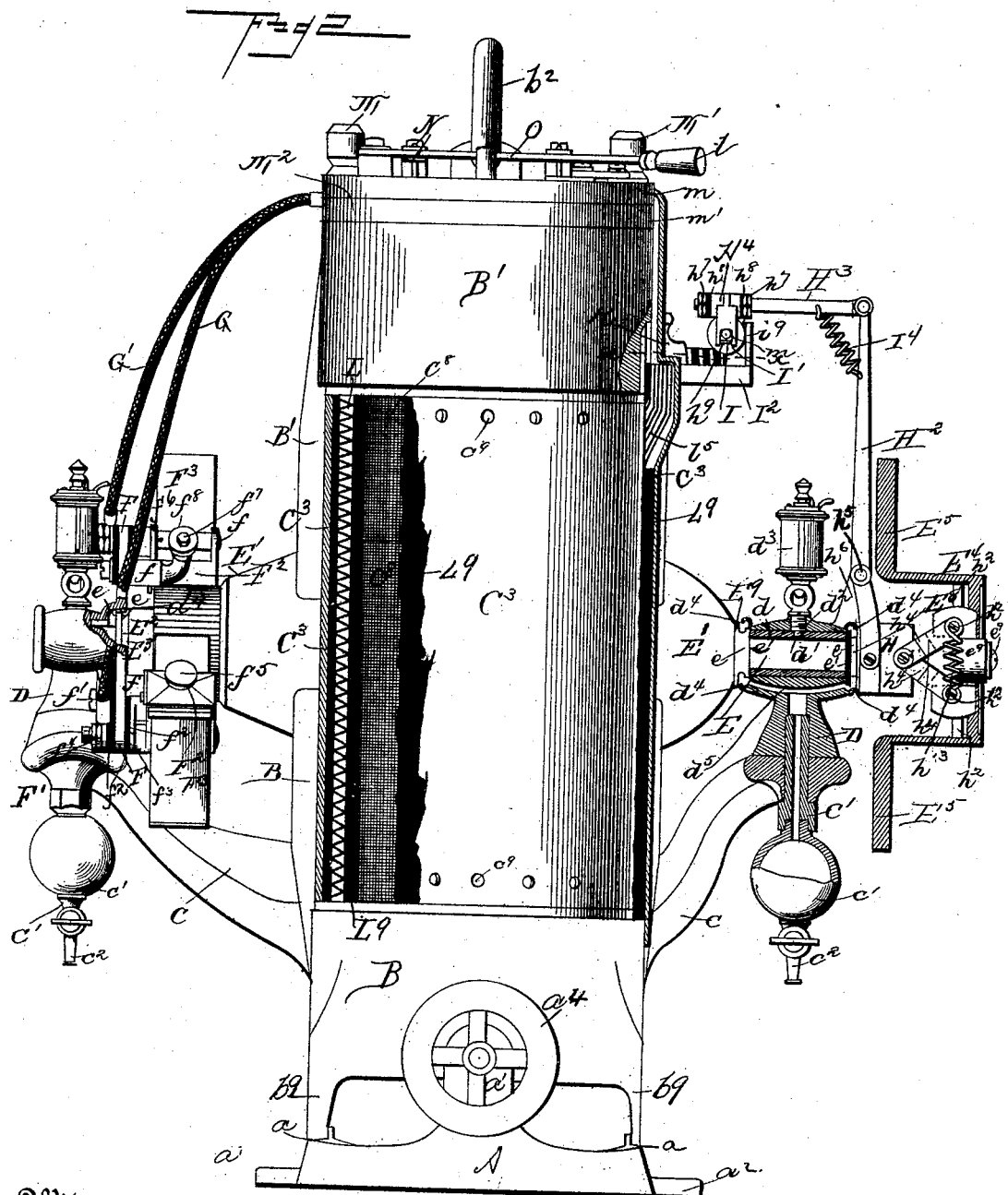

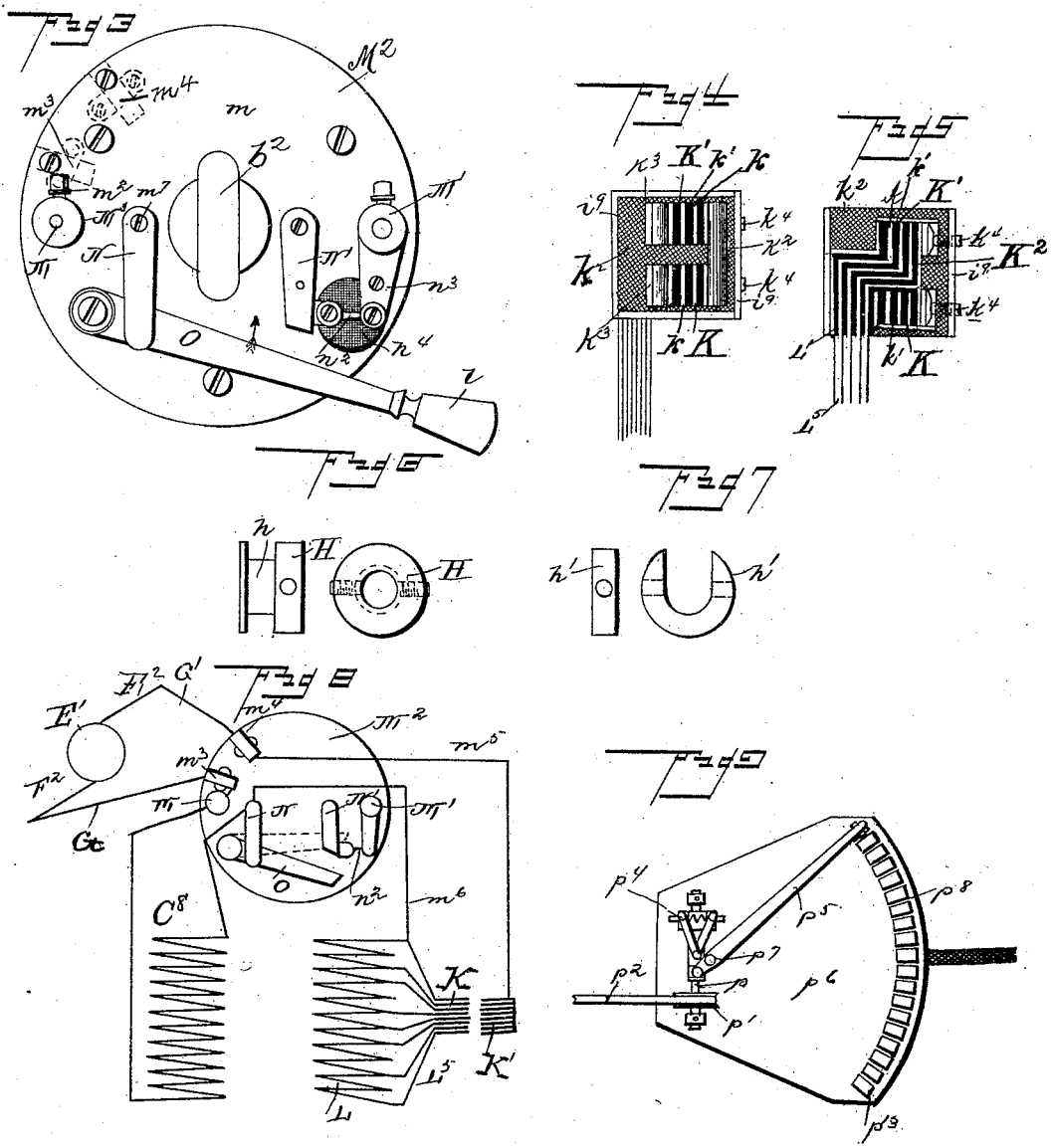

(No Model.)

J. W. DARLEY, Jr.
ELECTRIC MOTOR.

No. 467,924.  Patented Feb. 2, 1892.

4 Sheets—Sheet 4.

WITNESSES:
M. B. Harris
J. C. Wilson

INVENTOR
John W. Darley Jr.
BY
Whitman & Wilkinson
his ATTORNEYS.

UNITED STATES PATENT OFFICE.

JOHN W. DARLEY, JR., OF BALTIMORE, MARYLAND.

ELECTRIC MOTOR.

SPECIFICATION forming part of Letters Patent No. 467,924, dated February 2, 1892.

Application filed May 24, 1890. Serial No. 353,021. (No model.)

*To all whom it may concern:*

Be it known that I, JOHN W. DARLEY, Jr., a citizen of the United States, residing at Baltimore, in the State of Maryland, have invented certain new and useful Improvements in Electric Motors; and I do hereby declare the following to be a full, clear, and exact description of the invention, such as will enable others skilled in the art to which it appertains to make and use the same.

My invention relates to certain improvements in electromotors, and it has for its object to provide a motor in which the current passing through the armature will remain constant; and for this purpose it consists of a motor having its armature and field-magnet coils in shunt-circuit to each other, resistances (which are by preference arranged around the field-magnets and exert a magnetic influence thereon for economy of space and of electric energy) being included in the same shunt-circuit as the armature-coils, the said resistance being adapted to be put in and out of circuit by means of a contact-maker actuated by a centrifugal governor driven by the armature-shaft, so that as the speed of the latter becomes less from any cause, decreasing the counter electro-motive force generated by the coils of the armature below a certain determined limit a number of the said resistances will be included in the circuit, while upon an increase of the speed of the armature, increasing the counter electro-motive force generated thereby to a certain determined limit, the auxiliary resistance will be cut out of circuit, thus causing the amount of resistance included in the circuit below any determined speed to vary inversely as the counter electro-motive force of the armature-coils, but as the current passing through the coils of the armature (the electro-motive force remaining constant at the poles of the motor) will remain constant if the resistance of that circuit multiplied by the current plus the counter electro-motive force remains the same. It follows if the centrifugal governor is properly adjusted that such a result may be obtained.

My invention also consists of means for lubricating the armature-shaft of the motor and for preventing the lubricant from being thrown thereby; and it further consists in the combination, construction, and arrangements of the several parts of which it is composed, as will be hereinafter more fully described and claimed.

It will be evident that, while I will describe my invention as applied to a motor, several of the features thereof may be applied to other forms of electric machines.

Figure 11:
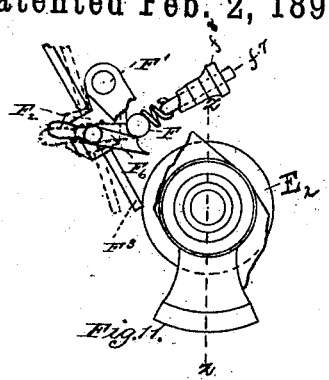
Figure 12:
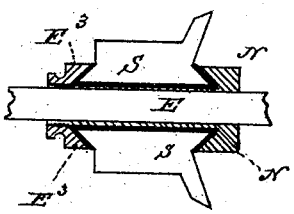
Figure 13:
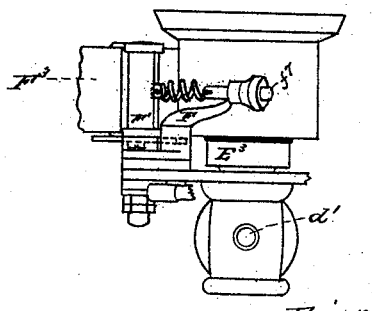
Figure 14:
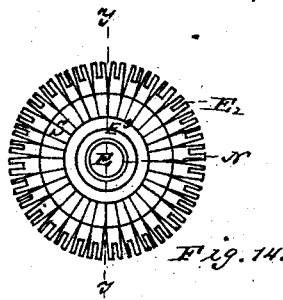
Figure 15:
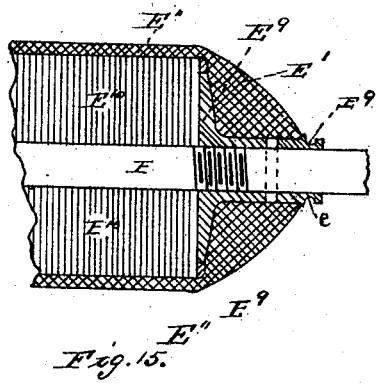

Referring to the accompanying drawings, in which corresponding parts are designated by similar letters, Figure 1 is a side view of a motor constructed according to my invention. Fig. 2 is a rear view thereof, certain 65 parts of the motor being broken away for the better illustration of the construction thereof. Fig. 3 is a view of the switch-board on the top of the upper pole-piece. Fig. 4 is a top view of the contact-plates. Fig. 5 is a horizontal section thereof on line $x$ $x$ of Fig. 2. Figs. 6 and 7 are detail views of parts of the centrifugal governor. Fig. 8 is a diagrammatic representation of the circuits in a motor constructed according to this invention. Fig. 9 is a detail plan view of a switch to be inserted in series with the armature-coils in cases where it is desired to use my invention in connection with a motor such as those already in use. Fig. 10 represents a vertical section of the commutator end of the motor-shaft, parts being broken away. It shows a section along the line $z$ $z$, Fig. 11. Fig. 11 represents an end view of the motor-shaft and commutator, parts being broken away. Fig. 12 represents a longitudinal section of the motor-shaft and commutator. Fig. 13 represents a plan view of the commutator and connections therewith. Fig. 14 represents an end view of the commutator. Fig. 15 represents a central longitudinal section of the laminated armature.

The bed A has a guide $a$ planed on both sides of its top, while a post $a'$ rises from its back, the bed being adapted to be secured in position by bolts, screws, &c., passing through the ears $a^2$ on its sides. The lower pole-piece B has supports $b^9$ formed upon its lower surface, which work upon the guides $a$ in the bed-piece. A screw $a^3$, having a hand-wheel $a^4$ upon its rear end, passes through the post $a'$ and bears upon the rear of the pole-piece B, whereby the latter may be moved backward and forward in the guides $a$, and as the armature-shaft, field-magnet, and upper pole-piece B' are carried upon the lower pole B the whole motor will be correspondingly moved, whereby the driving-belt for the armature-shaft may be tightened or loosened, as may be desired.

The lower pole-piece B has an upwardly-projecting horn $b$ on its forward face and supports the magnet $B^2$, the upper pole-piece B', which has a downwardly-projecting horn $b'$ on its forward face, being supported on the said magnet, the said parts being secured together by the bolt $b^2$ passing therethrough, the eye of which serves as a means for lifting the motor. A bracket C is cast or otherwise suitably secured on each side of the horn $b$ of the lower pole-piece, and supports on its outer end the bearing D of the armature-shaft, which is secured thereto by the hollow bolt C', which has secured to its lower end the ball $c'$, having the cock $c^2$. The bearings D are preferably bushed with phosphor-bronze, as at $d$, the bushing having an aperture $d'$ therein communicating through the passage $d^2$ with the oil-cup $d^3$, mounted on top of the bearing.

The armature-shaft E is mounted in the bearings on the opposite sides of the horn of the lower pole-piece and carries the armature E' and commutator $E^2$. The nut $E^3$ holds the commutator in place, while a nut $E^9$ clamps the opposite end of the armature E', the outer and opposite faces of the said nuts being square, as at $e'$, while an annular groove $e$ is formed upon their peripheries.

One of the bearings D, which is shown in section in Fig. 2, has overhanging annular lips $d^4$ upon both its outer and inner ends, the said lips surrounding the grooves $e$ in the washer $E^8$ and armature-nut $E^9$, respectively, while the opposite bearing has a corresponding lip $d^4$ upon its inner side, which surrounds the groove $e$ upon the commutator-nut $E^3$. Channels $d^5$, formed in the bearings D, communicating at their outer ends with the bases of the lips $d^4$ and at their inner ends with hollow bolt C', serve to convey the oil which has been thrown into the former by the faces of the rapidly-revolving armature and commutator-nuts and washer to the latter and thus to the ball $c'$, from which it will be withdrawn by the cock $c^2$. Although I have only shown one of the bearings in section, it will be understood that the arrangement of the parts of the opposite bearing correspond and are similar unless otherwise stated.

The armature E', which may be of any approved construction, has its proper coils connected with the sections of the commutator and revolves between the grooves in the upper and lower surfaces of the horns $b$ and $b'$ of the upper and lower pole-pieces, respectively, the said horns being connected by a plate of diamagnetic metal $B^4$, upon which may be placed the name of the maker, &c.

The arms F are secured to the upper forward and to the lower rear surface of the lip $d^4$ of that bearing which is near the commutator, each of the said arms having a finger $f$ projecting from its inner surface near its center, the said fingers being secured to the arms by screws $f'$, and insulated therefrom by the pieces $f^2$ and by means of suitable bushings. A pin F' passes through the outer end of each of the arms, through the outwardly-extending base $f^3$ of the finger $f'$, and through the insulating-pieces $f^2$, holding the two latter in place, the pins being held in place by the nuts $f^4$ upon the outside of the arm F, the nuts also serving to hold and make contact with the cables G and G', the pins F' and nuts $f^4$ being insulated from the arms F by the insulating-pieces $f^2$ and by means of insulating-bushings. The pins project from the inner surface of the arms F and have pivoted on their ends the brush-boxes $F^2$, the brushes $F^3$ being held in position by the thumb-screws $f^5$, the boxes $F^2$ being pivoted at one end to the pins F' and carrying in their opposite ends the brushes. A latch $f^6$ is pivoted to the free or brush end of each of the boxes $F^2$, and is adapted by having its one end caught upon a finger $f$ to hold the brushes away from the commutator, the opposite end of such latch serving as a handle for moving it. A screw $f^7$ passes through the inner or projecting end of each of the fingers $f$, its movement being regulated by the thumb-nut $f^8$, working upon one of its ends, the opposite end of the screw being connected to the corresponding brush $F^3$ by a spring $f^9$, by means of which the pressure of the brushes upon the commutator may be varied, the latches $f^6$ being so situated as to hold the brushes away from the commutator against the tension of the springs $f^9$, (only one of which is shown in Figs. 1 and 2, the opposite spring being concealed by other parts of the motor.)

On the projecting end of the shaft E is mounted the driving-pulley $E^4$, which has the annular flange $E^5$ on the inner end thereof, whereby the driving-belt is prevented from slipping over upon the centrifugal governor, which is also thus protected from other injury. This governor consists of a collar H, loosely mounted upon the shaft next to the washer $E^8$, the said collar having an annular groove $h$ therein, in the lower part of which groove the loop $h'$ is contained. On pins $h^2$, projecting from the hub $e^9$ of the driving-pulley $E^4$, balls $h^{12}$ are loosely mounted, the outward movements of the balls being limited by the inner surface of the pulley $E^4$. These balls, which are drawn together by the springs $h^3$ against the centrifugal force of the revolving shaft, are connected with the collar H by the links $h^4$, whereby when the balls are thrown outward the collar H will be drawn toward the end of the shaft. In so doing it will cause a corresponding movement of the lower end of the lever $H^2$, which is pivoted at $h^5$ to the ear $h^6$, projecting from the upper surface of the bearing D, and it will at the same time cause a contrary movement of the upper part of the lever, to which is attached one end of the arm $H^3$, the opposite end of the arm having a frame $H^4$ secured thereto by the nuts $h^7$ and insulated therefrom by the pieces $h^8$. The pendent uprights of the frame have slotted lower ends $m$, in which slots the axis I of the contact-roller I' rests, being locked therein by the pins $h^9$. A bracket $I^2$ projects from one side of the upper pole-piece B' and carries the frame $i^9$, holding the contact-plates K and K', the roller being held down therein by the spiral spring $I^4$, attached at its one end to the arm $H^3$ and at its opposite end to the lever $H^2$.

The two series of contact-plates K and K' each consist of a number of plates $k$, resting on edge side by side and being separated by the insulating-pieces $k'$. The sections themselves, which run parallel to each other, their length being transverse to the motor, are insulated from the frame $i^9$ and from each other by the insulation $k^2$, each of the sections being readily removed by loosening the screw $k^4$, working in the frame $i^9$, which clamps it in place in order to facilitate the changes of sections if they should be burned out or otherwise destroyed. The plates $k$ on the outer ends of both of the sections K and K' are connected together by an upward metallic extension $K^2$, each of the plates on the opposite or inner ends of each of the sections having a corresponding independent extension $K^3$, which is insulated from the extension $K^2$ of the opposite section by the insulation $k^2$, the extensions $K^2$ and $K^3$ serving as stops to limit the movement of the roller I', and at the same time make a contact therewith when the roller has reached the limits of its path. It will now be seen that as the speed of the armature-shaft varies the upper end of the lever $H^2$ will be moved to correspond therewith, causing the roller I' to move over the contact-sections K and K', completing an electrical circuit between those plates of the respective sections on which it may rest, and it will be further seen that when the armature is revolving very slowly or is at rest the circuit will be completed through the extension $K^2$ of the outer end of the sections, and that when it is making the maximum number of revolutions for which the motor may be adjusted the circuit will be closed through the extensions $K^3$ of the several sections and through the roller I', while for intermediate speeds of the armature the roller will occupy intermediate positions upon the sections K and K', completing the circuit at points dependent upon the position of the roller.

The several plates of the sections K are connected to the several points of the series of resistances L by means of strips L' and wires $L^5$ to the resistance on the magnet, the extension $K^2$ of the outer plates of both of the sections being connected to one end of the resistances, while the extension $K^3$ of the inner plate of section K is connected to the opposite end of the resistances, the same end thereof being also connected through a suitable switch to one of the binding-posts M' of the switch-board $M^2$, situated on top of the motor, the plates $k$ of the section K' being connected through the armature-coils with the opposite binding-post M. I preferably make the resistances L of wire in the form of a coil, as shown in Fig. 2, and arrange these coils around the field-magnet coils, whereby the electric energy of the current passing therethrough is utilized in strengthening the magnet. The coil-resistances L are in this case insulated from the field-magnet coils $C^8$ by a layer of insulating material $L^9$, and it will be evident that several layers of such resistances may be placed one above the other, being separated by such a layer of insulating material.

A metallic cover $C^3$ surrounds the field-magnet coils $C^8$ and the resistances L, protecting these parts against injury, the upper and lower end of the cover resting against the pole-piece B' and B, respectively, while holes $c^9$ are cut therein to permit the circulation of air in order to cool the coils and resistances.

A switch-board $M^2$ is mounted on top of the upper pole-piece, being composed of two layers of wood $m$ and $m'$, the one situated above the other. On top of the upper layer $m$ are secured the two binding-posts M and M', to which the main supply-cables connecting the motor with the source of electricity are secured, while the former post is connected by the strip $m^2$ with the binding-post $m^3$, to which latter one end of the cable G is connected, the opposite end thereof being connected to one of the brushes $F^2$, and thus to the armature-coils, the opposite brush being connected to the other binding-post $m^4$, also situated on the switch-board $M^2$, by the return-cable G'. The cables G and G' preferably enter the switch-board between the thicknesses of the two pieces of which it is composed, and are connected to the binding-posts $m^3$ and $m^4$ in the manner shown in dotted lines in Fig. 3. The binding-post $m^4$ is connected to all of the contact-plates $k$ of the section K' by a wire $m^5$. (Shown diagrammatically in Fig. 8.) The current after passing to the plates $k$ of the section K in the manner already described passes through the resistances L to the springs N by means of a wire $m^6$, also shown in Fig. 8. These springs are secured at one end to the upper thickness $m$ of the switch-board by means of the screw $m^7$, one of the said springs lying above the other and being separated therefrom by the switch-lever O, which remains constantly between, and which is thus constantly connected with the resistances L. The switch-lever is pivoted at one end to the layer $m$ of the switch-board, its opposite end, which has an insulated handle $l$ thereon, being adapted, when thrown in the direction of the arrow in Fig. 3, to slide between the springs N', which are similar to the springs N, the lower of the said springs being connected by means of the fusible strip $n^2$ and connection $n^3$ with the binding-post M'. In order to avoid danger from the molten matter of the strip $n^2$ falling upon the switch-board $M^2$ if the current should become so strong as to melt the former, I place a plate $n^4$ of slate underneath the fusible strip, it being let into the upper thickness $m$ of the switch-board, so that its top is flush with the upper surface thereof. As there is danger that a person may attempt to insert a new strip, (the one already in place having been destroyed by the current,) I place the fusible strip in such a position that it will be covered by the switch-lever when the latter is completing the circuit, the fusible strip being uncovered only when the circuit is broken.

The field-magnet coils $C^8$ have their one end connected to the binding-post M of the main cable and their opposite end connected to the springs N, as is shown diagrammatically in Fig. 8, they being in shunt-circuit in respect to the armature-coils.

From an inspection of Fig. 8, the switch being in the position shown in dotted lines, it will be seen that the current entering through, say, the binding-post M divides, a part passing through the coils $C^8$, thus energizing the field-magnets, while the remainder passes through the armature-coils E' to the section K' of the contact-plates, through the contact-roller I' to the section K, and through the auxiliary resistances L to the springs N, where it unites with the current flowing through the coils $C^8$. The full current will then pass through the switch-lever O, and through the springs N', the fusible strip $n^2$, and connection $n^3$ to the binding-post M' and to the return-cable. In following these paths it will be evident that the amount of current in the field will remain constant as the electro-motive force is constant. The current in the armature will vary inversely as the resistance in circuit, multiplied by the current plus the counter electro-motive force, varies, (the resistance of the coils of the field-magnet being constant,) and, as has been described, the amount of the resistance L included in the circuit of the armature varies inversely as the speed of the armature, the amount of current passing through the armature would vary directly as the speed thereof; but as the counter electro-motive force generated by the armature also varies directly as its speed, it follows that the amount of current passing through the armature-coils will remain constant at any determined speed below the proper working speed of the motor if a proper adjustment exists in the governing device. It will be evident that the inclusion or exclusion of the above-described resistances L only serves to keep the strength of the current passing through the armature constant until the armature acquires a certain determined speed and does not decrease or increase the strength of the current supplied to the motor by the main cables $M^3$. As it may be desired to insert such resistances in the circuit of the armatures of the motors such as those now in use, I may provide an independent switch P, which may be readily inserted in such circuits, and this switch is shown in Fig. 9. A shaft $p$ has a pulley $p'$, over which passes a driving-belt $p^2$, the said belt also passing over any convenient part of the armature-shaft, (such as the before-described pulley E,) by means of which motion is imparted to the shaft $p$, the speed of which necessarily varies as the speed of the armature-shaft. A centrifugal governor $p^4$, similar to that before described in connection with that armature-shaft, is mounted on one end of the shaft, the lever $p^5$ (which corresponds to the lever $H^2$) being in this case pivoted on the switch-board $p^6$ by means of the pin $p^7$. The free end of the lever passes over a series of contact-plates $p^8$, arranged concentric to the pin $p^7$. These contact-plates are connected by resistances $p^9$, (not shown,) one end $p^{13}$ of the series of plates $p^8$ being connected with the armature-coils, while the lever is connected through its pivotal pin $p^7$ with the opposite binding-post of the motor. It will be seen that as the speed of the armature-shaft varies the speed of the shaft $p$ will undergo a corresponding change, causing, by means of the governor $p^4$, the free arm of the lever $p^5$ to sweep over the contact-plates $p^8$, cutting out or placing in the circuit a corresponding number of the resistances $p^9$, and thereby causing this device to be the full equivalent of that hereinbefore described.

I am aware that Edison in his patent, No. 248,429, dated October 18, 1881, has described a centrifugal governor for injecting graded resistances into the armature-circuit, and I do not claim, broadly, either a centrifugal governor for inserting resistances or auxiliary resistances inserted into the motor-circuit; but I claim my improved form of governor possesses superior advantages over that of Edison, in that it cannot be actuated except by revolving the armature-shaft, and in other respects is different therefrom, and, moreover, by having the auxiliary resistance-coils wound about the field-magnets the strength of the said magnets and of the motor is made greatest at the moment of starting when that strength is most needed.

Having thus described my invention, what I claim, and desire to secure by Letters Patent, is—

1. In a regulator for electric motors, the combination, with the armature-shaft, of a loose collar mounted thereon, a centrifugal governor revolving with said shaft and connected to said loose collar and moving the same along the axis of said shaft, a lever connected at one end to said loose collar and having a fixed pivot attached to one of the bearings of the armature-shaft, a horizontal rod hinged at the other end of said lever, a contact-roller beneath said horizontal rod, contact-plates beneath said horizontal roller, auxiliary resistance-coils connected to said contact-plates, and a spring connecting said horizontal rod with said lever and pressing said contact-roller on said contact-plates, substantially as described.

2. In a regulator for electric motors, the combination, with the armature-shaft, of a loose collar mounted thereon, a centrifugal governor revolving with said shaft and connected to said loose collar and moving the same along the axis of said shaft, a lever connected at one end to said loose collar and having a fixed pivot attached to one of the bearings of the armature-shaft, a horizontal rod hinged at the other end of said lever, a contact-roller beneath said horizontal rod, contact-plates beneath said horizontal roller, auxiliary resistance-coils wound around the field-magnets and connected to said contact-plates, and a spring connecting said horizontal rod with said lever and pressing said contact-roller on said contact-plates, substantially as described.

3. In a centrifugal governor for electric motors, the combination, with the armature-shaft, of a hollow pulley mounted thereon, two balls moving along opposite radial guides within said hollow pulley, a spring normally holding said balls toward the center of said pulley, a loose collar mounted on said shaft, a movable contact-maker connected to said collar and actuated thereby, and hinged rods connecting said balls to said loose collar and moving said loose collar along said shaft as the armature revolves, substantially as described.

4. In a switch, the combination, with a circuit of conductors, of a fusible strip included therein, and a switch-bar covering said strip when said circuit of conductors is completed, substantially as described.

5. The combination, with a revolving shaft, of a series of contact-plates, resistances connected therewith, a contact-roller moving over the said contact-plates, a collar mounted on the said shaft and connected to balls rotated thereby, a groove in the said collar, an open loop contained in the said groove, a lever connected with the said loop and with the contact-maker, and a spring connected to said lever and pressing said contact-roller down on said plates, substantially as described.

In testimony whereof I affix my signature in presence of two witnesses.

JOHN W. DARLEY, Jr.

Witnesses:
  ERNEST WILKINSON,
  VERNON M. DORSEY.